United States Patent
Greenburg et al.

[11] 3,728,083
[45] Apr. 17, 1973

[54] POLYMER FINISHER

[75] Inventors: Julius Greenburg, Richmond; Laszlo Joseph Balini, Chester; William Norman Russell, Colonial Heights, all of Va.

[73] Assignee: Allied Chemical Corporation, New York, N.Y.

[22] Filed: Mar. 3, 1971

[21] Appl. No.: 120,582

[52] U.S. Cl................23/285, 23/290, 159/25 R, 159/11 B, 159/6 WH, 55/55, 55/193, 55/199, 261/92, 416/175, 260/75 T
[51] Int. Cl................B01j 1/00, C08f 1/98
[58] Field of Search..............23/285, 284, 290, 23/252, 270; 159/25 R, 11 B, 10, 6 WH; 55/55, 193, 202, 203, 199; 261/92; 416/175

[56] References Cited

UNITED STATES PATENTS

| | | | |
|---|---|---|---|
| 3,617,225 | 11/1971 | Kuehne et al. | 23/285 |
| 3,306,340 | 2/1967 | Hoffman et al. | 159/10 |
| 3,440,019 | 4/1969 | Albrecht et al. | 23/285 |
| 3,498,762 | 3/1970 | Van Der Schee | 23/285 |

FOREIGN PATENTS OR APPLICATIONS

| | | | |
|---|---|---|---|
| 468,051 | 9/1935 | Great Britain | 261/91 |

Primary Examiner—James H. Tayman, Jr.
Attorney—Luther A. Marsh

[57] ABSTRACT

Apparatus for promoting polymerization reactions such as polyester wherein an inner edge of the rim of a wheel in the rotating element of the apparatus is left intact in a continuous circle, and projections of specific designs are attached wherein pumping action can be obtained without interfering with the ability of the wheel to film polymer melts up to about 100,000 poises viscosity.

2 Claims, 6 Drawing Figures

PATENTED APR 17 1973 3,728,083

INVENTOR.
JULIUS GREENBURG
LASZLO JOSEPH BALINT
BY WILLIAM NORMAN RUSSELL

ATTORNEY 3,728,083

POLYMER FINISHER

BACKGROUND OF THE INVENTION

This invention relates to an apparatus for preparing an improved high viscosity polymer of polyester. More particularly, this invention relates to an apparatus for conversion of liquid material of a certain viscosity into a liquid material of higher viscosity by making the volatiles generated during the polycondensation reaction more rapidly while simultaneously removing said volatiles thus maintaining higher quality polymer. Still more particularly, this invention relates to an apparatus for converting low viscosity liquid material into a higher viscosity liquid material range in order to produce an improved polymer of fiber-grade viscosity. Even more particularly, this invention relates to an improved apparatus for preparing higher viscosity synthetic polymeric material by accelerating the polycondensation part of the reaction wherein the polymer has a viscosity up to about 100,000 poises.

U.S. Pat. No. 3,358,422 illustrates degassing with substantially simultaneous removal of volatiles in the preparation of high viscous liquid materials. To combine such a system with one wherein even greater viscosity is obtained having substantially all volatiles removed in a shorter period of time and thus yielding an improved quality of polymer therefrom would thus make a considerable contribution to this complex art.

Therefore, a prime object of this invention is to provide an improved liquid material polymer finisher apparatus for producing an improved fiber grade polymer.

Another object of this invention is to provide an improved polymer finisher apparatus for producing improved fiber grade polymer by substantially removing all volatile materials from the liquid material undergoing polycondensation through surface renewal by improved filming, mixing, and pumping of said polymer throughout the apparatus.

A further object is to control residence time within the reaction vessel, and particularly by regulating the level in the discharge section of the reactor.

Other objects and a more complete understanding of the present invention can be had by referring to the following description and claims.

SUMMARY OF THE INVENTION

According to the present invention there is provided a horizontal cylindrical vessel for finishing liquid viscous material which is provided with an inlet and outlet for said material at opposite ends of said vessel and at least one outlet for the removal of volatile material, a rotatable agitator mounted substantially concentric with the horizontal cylindrical axis for rotation within said vessel and having a drive shaft for rotating said agitator, said shaft having spoked wheels, the inner edge of each wheel rim being left intact in a continuous circle, the outer edge of the wheel rim having projections which allow continuous filming and flowing action of said material having a poise velocity of from about 1,000 poises to about 100,000 poises.

A better understanding of the nature and objects of this invention will be seen when reference is made to the following detailed description taken in connection with the accompanying drawings in which:

FIG. 1 is a perspective view illustrating projections attached to the outer edge of the spoked wheel in accordance with the present invention.

FIG. 1-A is a perspective view illustrating a plowlike projection attached to the outer edge of the spoked wheel in accordance with another embodiment of the present invention.

Figure 1:
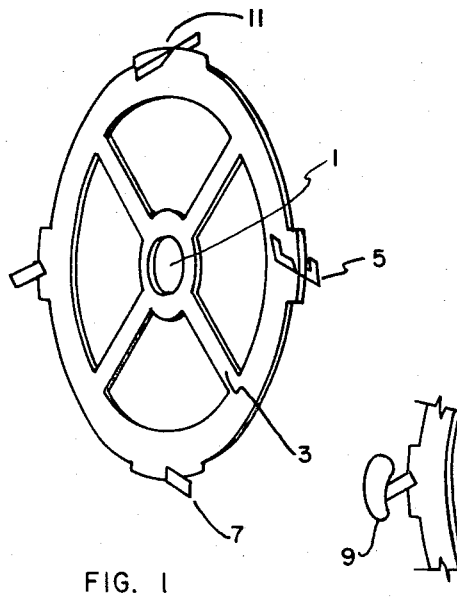
Figure 1A:
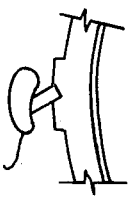

FIG. 1 shows in perspective view and illustrates examples of projections attached to the outer edge of the spoked wheel useful in accordance with embodiments of the present invention. Spoked wheel 1 is mounted onto a drive shaft for the rotation of an agitator within a substantially concentric horizontal vessel, not shown, said wheels are as numerous as necessary in order to obtain the desired objectives of this invention. Usually, one wheel per bay of said vessel is preferred. Projections 5, 7, 9 and 11 of FIGS. 1 and 1-A are examples illustrating various types of projections that are useful in carrying out the objectives of this invention. These illustrated projections are in the form of welded projections as in 5, 7, 9 and 11, or as cuts into the wheel rim as in 23 of FIG. 5, and as shown prior to the bending as shown in 21 of FIG. 4.

The size of the projection and particularly the size of the projection support is critical to the filming characteristics. The angle of the projection and support thereof can vary from about 10° to about 45°, and the projection alone cannot exceed 50 percent of the total rim width for good filming. Preferably, two-thirds of the inner face of the rim is left intact. The projection acts as a turbine where it picks up a portion of the polymer on one side and moves it to the other side, after which it gives the polymer an additional push to move it in much the same manner as a pump. These projections actually give a reverse hydraulic gradient by actually allowing a higher liquid level at the discharge end of the vessel than at the inlet end, thus allowing filming throughout the reactor.

Filming and pumping are both not only necessary to remove the volatiles during the reaction but to control the residence time of the polymer within the reactor in order to obtain the desirable viscosity level. The $h/D$ (height of liquid to vessel diameter) of the turbine wheel of this invention is one of its great advantages in that it films at an $h/D$ as low as 0.17. This means that any bay or section of the finishing reactor having a section this low will be filming. With prior art reactors, an $h/D$ below 0.23 in some bays, usually near the discharge end of the reactor, will not film. In such a case the only film renewal possible is the material wiped onto the rim during each pass through the mass of material in the reactor bay. Theoretically, in such case, an increase in speed would increase the surface generation, but taken to extremes in speed, the polymer simply wraps around the shaft and no film renewal or pumping is accomplished.

The h/D is defined as the equilibrium height ($h$) of polymer measured in a horizontal reactor (or chamber, bay or section of a reactor) with the agitator turned off divided by the inside diameter ($D$) of the reactor.

Figure 2:
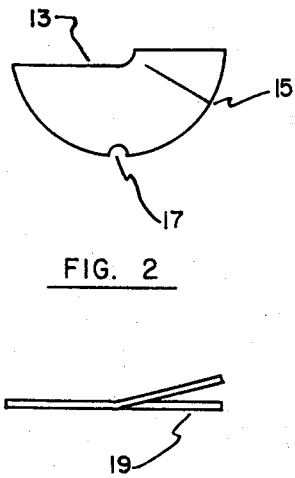
FIG. 2 is an elevation view of a baffle having an offset slit and a drain aperture in accordance with another embodiment of this invention.

The wheels as designed in accordance with this invention can be used with or without baffles as shown in FIG. 2. However, some type of baffling is preferred, particularly at high viscosities. The baffling allows closer placement of the wheels without carry around of the polymer between the wheels and is quite helpful in obtaining a normal residence time, distribution pattern in the finisher reactor. In addition, baffles with an offset slit 15 of FIG. 2 have been found in accordance with this invention to have the advantage of retaining the polymer on the downstream side of the wall and further substantially prevents back-mixing commonly associated with other types of baffles. The offset slit can be made in a variety of angles and at varying heights above the base of the reactor finisher. In general, the higher the viscosity prepared, the higher the slit is to be placed since the mass of polymer is lifted higher by the wheel rim as its viscosity increases.

Figure 3:
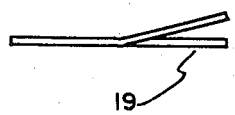
FIG. 3 is a plan view of the offset slit detail of the baffle as shown in FIG. 2 illustrative of this embodiment of the invention.

The projections, in another variant of this invention, are in the form of plows set at a distance from the wheel rim by spacer bars. This type projection 9 is illustrated in FIG. 1. Again, a portion of the outer edge of the rim is cut away to facilitate pumping of the polymer. The plows of this variant of this invention have the peculiar advantage of mixing the polymer within a bay or chamber of the finisher reactor by pulling the polymer from the previous chamber and folding it onto the wheel, combined with turbine-type projections on the discharge side of the wheel which pumps the polymer into the subsequent chamber. The offset slit 15 of FIG. 2 is shown in more detail as an offset slit 19 of FIG. 3. Cut-out 17 of FIG. 2 is merely a passage to allow draining of the vessel.

The projections useful in this invention can be of a variety of designs within the size and angle limitations as designed previously. The designs may differ from wheel to wheel as well as from one side of wheel to the other side of wheel.

The number of chambers within the finisher reactor can vary. Further, the number of wheels as well as the number of projections on each wheel can vary, depending upon the desired viscosity and flow rate.

Operation of this reactor finisher can easily be understood. Liquid polymer of low viscosity is fed by suitable means into the inlet end of the horizontal reactor finisher and passes to the other end and out through suitable means not shown. The flow from inlet to outlet of said reactor finisher is effected by the interrelationships of the various components of the reactor apparatus with the polymeric liquid material being finished. The filming and substantially simultaneous pumping of this invention is brought about by allowing the inner edge of the rim of a wheel to be left intact in a continuous circle with projections of specific designs attached as outlined heretofore. The projections may be of various designs as long as they are within the size and angle limitations outlined above.

The unsupported film within each chamber yields an improved degassed polymeric material as the material is filming continuously thereby contributing to a good mass transfer rate between the film and the vapor. The material also is being subjected to a pumping action simultaneously that is controllable and obtained without interfering with the ability of the wheel to film polymer melts.

The feed polymer utilized in the operation of this invention may be as low as 1,000 poises in viscosity. The finished product viscosity may range up to 100,000 poises after the polycondensation reaction is substantially complete. The agitator speed can vary from between 0.1 rpm to about 15 rpm depending upon the polymer viscosity. The finisher reactor is more preferably operated at vacuum levels between 0.1 mm Hg absolute and 50 mm Hg; however, it can be operated using an atmosphere of nitrogen or steam and under pressure if necessary for process reasons. The normal operating liquid in the finisher reactor can be between about 10 and about 40 percent of said reactor volume.

The finisher reactor of the invention is particularly suited for the production of polyesters; however, it is equally suitable for any polycondensation material in which volatiles evolved during polycondensation must be efficiently removed and the residence time within the reactor must be controlled to maintain a quality product.

The following examples illustrate the apparatus, process, and end-product obtained utilizing this invention:

EXAMPLE 1

Forty-five pounds per hour of terephthalic acid and 26 pounds per hour of ethylene glycol are continuously fed to the direct esterification system of a continuous polymerization train. The esterified product is partially polymerized in a horizontal agitated vacuum reactor to a product having intrinsic viscosity of 0.6 (measured in 60:40 phenol:tetrachloroethane) and carboxyl end group concentration of 17 milliequivalents per kilogram. This product is continuously fed into another horizontal reactor at 280° C. and 1 torr pressure. This reactor has an internal diameter of 30 inches and an effective length of 25 inches. It contains an agitator with a series of cart wheels connected to a central shaft, each cart wheel rotating between baffles. During operation the agitator is rotated at 0.5 rpm. The level is maintained at the minimum required to obtain a constant discharge from the exit screw. The product from this reactor has an intrinsic viscosity of 0.98 and a carboxyl end group concentration of 23 milliequivalents per kilogram. This product is pumped to a spin block and converted into a 1,300 denier, 192 filament tire yarn.

EXAMPLE 2

Figure 4:
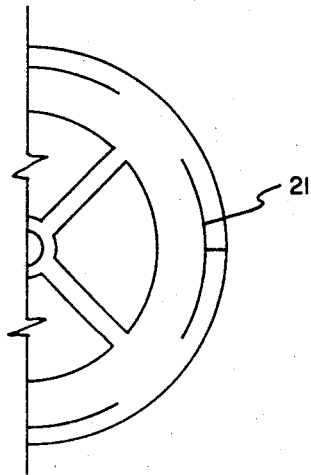
FIG. 4 is an elevation view of the wheel rim wherein cuts are made in the wheel rim and bending the resulting so called "ears" one to the right, one to the left in sequence around the wheel rim in accordance with an embodiment of the invention.
Figure 5:
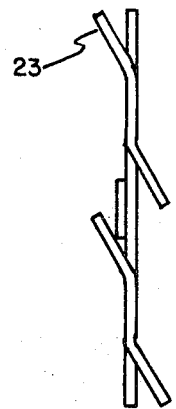
FIG. 5 is a side view of the cuts after being bent of FIG. 4 illustrative of this embodiment of the invention.

Polyethylene terephthalate is made in the same way as in Example 1, with the exception that the final reactor is modified and is operated in a method to be designated later in this example. The modification of the reactor consists of removing the existing baffles and cart wheels and replacing them with baffles to make four chambers each of 5-inch width, and four wheels each containing projections on their outer circumference as shown in FIGS. 4 and 5. These wheels are attached to a rotatable shaft. The height of the polymer with no agitation divided by the diameter of the vessel, $h/D$, is maintained at 0.20 on the average. During operation the wheels are driven at 0.5 rpm and it is found that no problem is encountered in maintaining a constant discharge from the exit screw although the average polymer level in the reactor is much lower than in Example 1. The product from this reactor has an intrinsic viscosity of 1.00 and a carboxyl end group concentration of 12 milliequivalents per kilogram. As in Example 1, the product is pumped to a spin block and converted to a 1,300 denier, 192 filament tire yarn.

The yarns of Examples 1 and 2 are tested for physical properties using an Instron tester and sealed tube heat stability tester. (Conditioned at 75° F., 65 percent relative humidity for 24 hours, sealed in glass tube, exposed to 300° F. for 48 hours, and the percentage of strength retention determined.) The results are as follows:

| Yarn Source | U. T. S. Grams Per Denier | U. E, % | Heat Stability, % Strength Retained |
|---|---|---|---|
| Example 1 | 9.0 | 14.2 | 82 |
| Example 2 | 9.2 | 14.3 | 87 |

The yarns of these examples are converted into three-ply, 8 × 8 twist, tire cords, tensilized and incorporated into test tires. These are run on the test wheel under Department of Transportation conditions. It is found that the average running time to failure of Example 1 cords is 51 hours (five tires). The average running time for five tires of Example 2 cords is 62 hours.

We claim:

1. An apparatus for finishing liquid viscous polymer material which comprises a horizontal cylindrical vessel, an inlet and outlet for said material at opposite ends of said vessel and at least one outlet for the removal of volatile material, a jacket for heating of material, a rotatable agitator mounted substantially concentric with the horizontal cylindrical axis for rotation within said vessel and having a drive shaft for rotating said shaft, said shaft having spoked wheels, the inner edge of each wheel rim being left intact in a continuous circle, the outer edge of each wheel rim having projections which allow continuous filming and pumping action from the inlet to the exit end of the reactor of said material having a melt viscosity of from about 1,000 poises to about 100,000 poises, said wheel rim projections being attached to the outer edge of the wheel rim, the width of the projection not exceeding fifty percent of the total wheel rim width and the angle of projection being from about 10° to about 45°.

2. An apparatus for finishing liquid viscous polymer material which comprises a horizontal cylindrical vessel, an inlet and outlet for said material at opposite ends of said vessel and at least one outlet for the removal of volatile material, a jacket for heating of material, a rotatable agitator mounted substantially concentric with the horizontal cylindrical axis for rotation within said vessel and having a drive shaft for rotating said shaft, said shaft having spoked wheels, the inner edge of each wheel rim being left intact in a continuous circle, the outer edge of each wheel rim having projections which allow continuous filming and pumping action from the inlet to the exit end of the reactor of said material having a melt viscosity of from about 1,000 poises to about 100,000 poises, said wheel rim projections being an integral part of said rim, each projection spaced at an angle of projection between about 10° and about 45° from the exterior side of said wheel rim, and said projections not exceeding fifty percent of the total wheel rim.

* * * * *